US008660927B2

(12) United States Patent
Cassano et al.

(10) Patent No.: US 8,660,927 B2
(45) Date of Patent: Feb. 25, 2014

(54) COLLATERALIZED LOANS WITH PERIODIC DRAWS SUBJECT TO A TRIGGERING EVENT

(71) Applicant: Goldman, Sachs & Co., New York, NY (US)

(72) Inventors: William J. Cassano, Berkeley Heights, NJ (US); Alexander A. Dubitsky, Larchmont, NY (US); Amar Kuchinad, New York, NY (US); Charles McGarraugh, Brooklyn, NY (US); Samuel Ramos, Manhasset, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 13/872,909

(22) Filed: Apr. 29, 2013

(65) Prior Publication Data

US 2013/0238528 A1  Sep. 12, 2013

Related U.S. Application Data

(62) Division of application No. 12/172,034, filed on Jul. 11, 2008, now Pat. No. 8,433,649.

(60) Provisional application No. 60/949,794, filed on Jul. 13, 2007.

(51) Int. Cl.
*G06Q 40/00* (2012.01)

(52) U.S. Cl.
USPC .............................................. 705/35; 705/38

(58) Field of Classification Search
USPC ...................................................... 705/35, 38
See application file for complete search history.

(56) References Cited

U.S. PATENT DOCUMENTS

| 5,991,745 | A  | * | 11/1999 | Kiritz ............................. | 705/38 |
| 8,131,637 | B1 | * | 3/2012  | Rupp et al. ..................... | 705/38 |
| 2006/0149647 | A1 | * | 7/2006 | Sogin et al. .................... | 705/35 |

* cited by examiner

*Primary Examiner* — Samica L Norman
(74) *Attorney, Agent, or Firm* — Perkins Coie LLP

(57) ABSTRACT

This document describes techniques for implementing a collateralized loan with periodic draws subject to a triggering event. These techniques include receiving funds from a client and establishing a credit line collateralized by the funds. The techniques may further include periodically dispensing an amount from the credit line upon occurrence of a predetermined event (e.g., the client's attainment of a certain age) and until death of the client. At the death of the client, any remaining funds may then be released to, for example, the client's estate.

20 Claims, 5 Drawing Sheets

COLLATERALIZED LOANS WITH PERIODIC DRAWS SUBJECT TO A TRIGGERING EVENT

RELATED APPLICATION

This application is a divisional of U.S. application Ser. No. 12/172,034, entitled "Collateralized Loans With Periodic Draws Subject To A Triggering Event", filed Jul. 11, 2008, which claims the benefit of U.S. Provisional Application No. 60/949,794 filed on Jul. 13, 2007, the contents of which are hereby incorporated by reference herein in their entirety for all purposes.

SUMMARY

This document describes techniques for implementing a collateralized loan with periodic draws subject to a triggering event. These techniques include receiving funds from a client and establishing a credit line collateralized by the funds. The techniques may further include periodically dispensing an amount from the credit line upon occurrence of a predetermined event (e.g., the client's attainment of a certain age) and until death of the client. At the death of the client, any remaining funds may then be released to, for example, the client's estate.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, and/or any other subject matter consistent with the context above and throughout the document.

BRIEF DESCRIPTION OF THE CONTENTS

DETAILED DISCUSSION

Overview

This document describes techniques for implementing a collateralized loan with periodic draws subject to a triggering event. This loan may be either recourse or non-recourse. To start, a borrower and a loaning party establish a line of credit that enables the borrower to begin drawing off of the line of credit at a predetermined time (e.g., a predetermined date or at an occurrence of a predetermined event). The borrower secures this line of credit by some type of collateral such as financial assets in a fund. The borrower may open up a fund in order to establish the credit line, or the borrower may use an existing traditional fund to establish the credit line. The amount of each draw, meanwhile, may be a percentage of the collateral at a time of the first draw or at a time of the availability of the first draw. For instance, the amount of each draw may be equal to a percentage of the amount of financial assets in a fund at the predetermined time. In some instances, the borrower has the option to draw on this line of credit according to a periodic schedule from the predetermined time until the occurrence of a triggering event (e.g., the borrower's death).

At the occurrence of the triggering event, the borrower (or the borrower's estate, in some instances) repays the loan and any interest accrued thereon. The borrower or the borrower's estate also receives the remaining collateral from the loaning party. At the occurrence of the triggering event, the borrower or the borrower's estate may choose to have the loaning party deduct the loaned amount and any accrued interested from the collateral. The loaning party then returns remaining collateral, if any, to the borrower or the borrower's estate. Conversely, the borrower or the borrower's estate may choose to pay loaned amount (along with any interest and fees charged thereon) to the loaning party.

In instances where the triggering event is the death of the borrower, the borrower may rely on taking these periodic draws from the predetermined time until the borrower's death. This loan thus provides security for the borrower in the borrower's later years in life.

Exemplary Process

Figure 1:
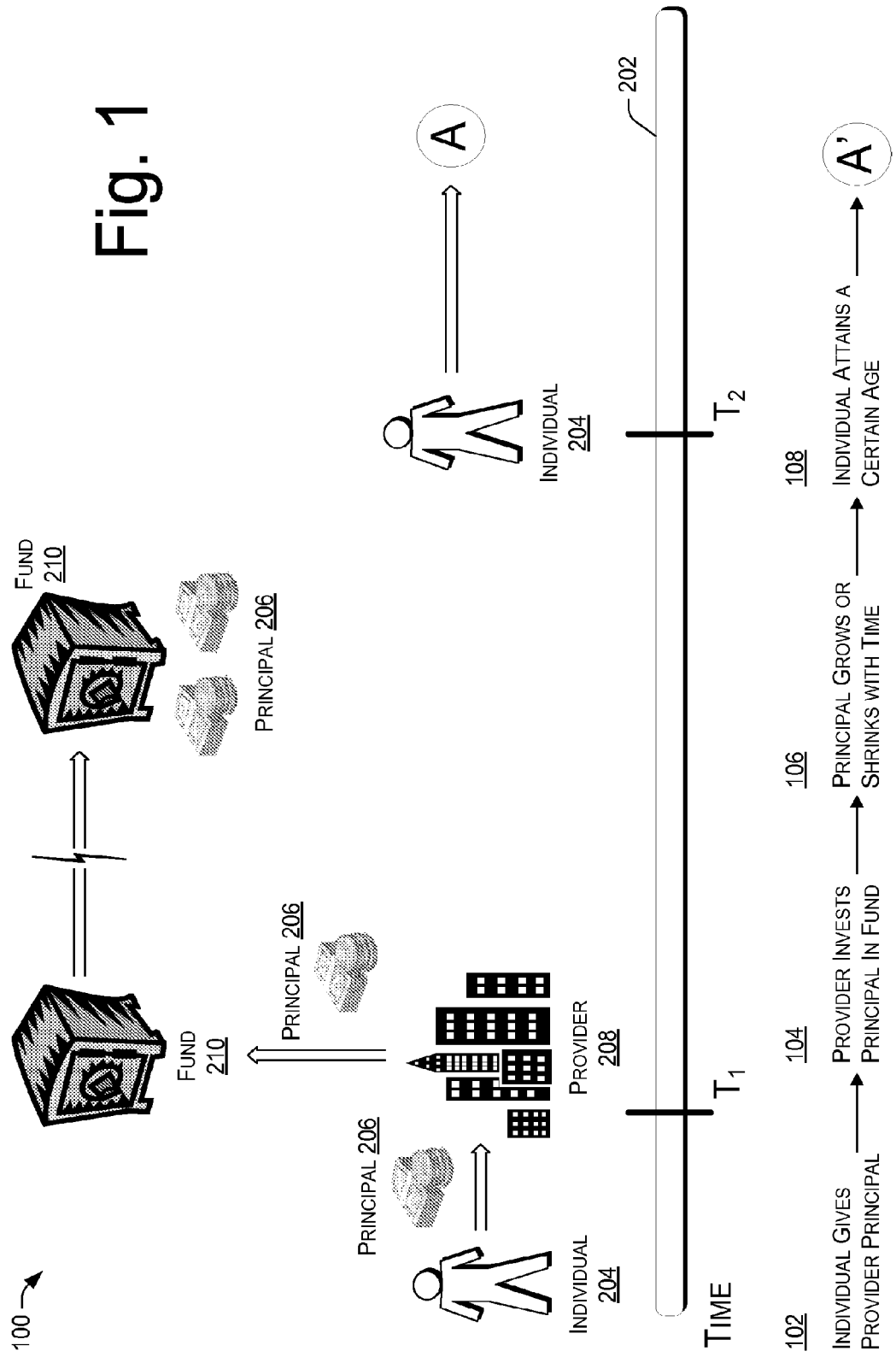
FIGS. 1-3 illustrate an exemplary process to employ a collateralized loan with periodic draws subject to a triggering event. This process is described with reference to a timeline that tracks the loan's life cycle from inception to conclusion.
Figure 2:
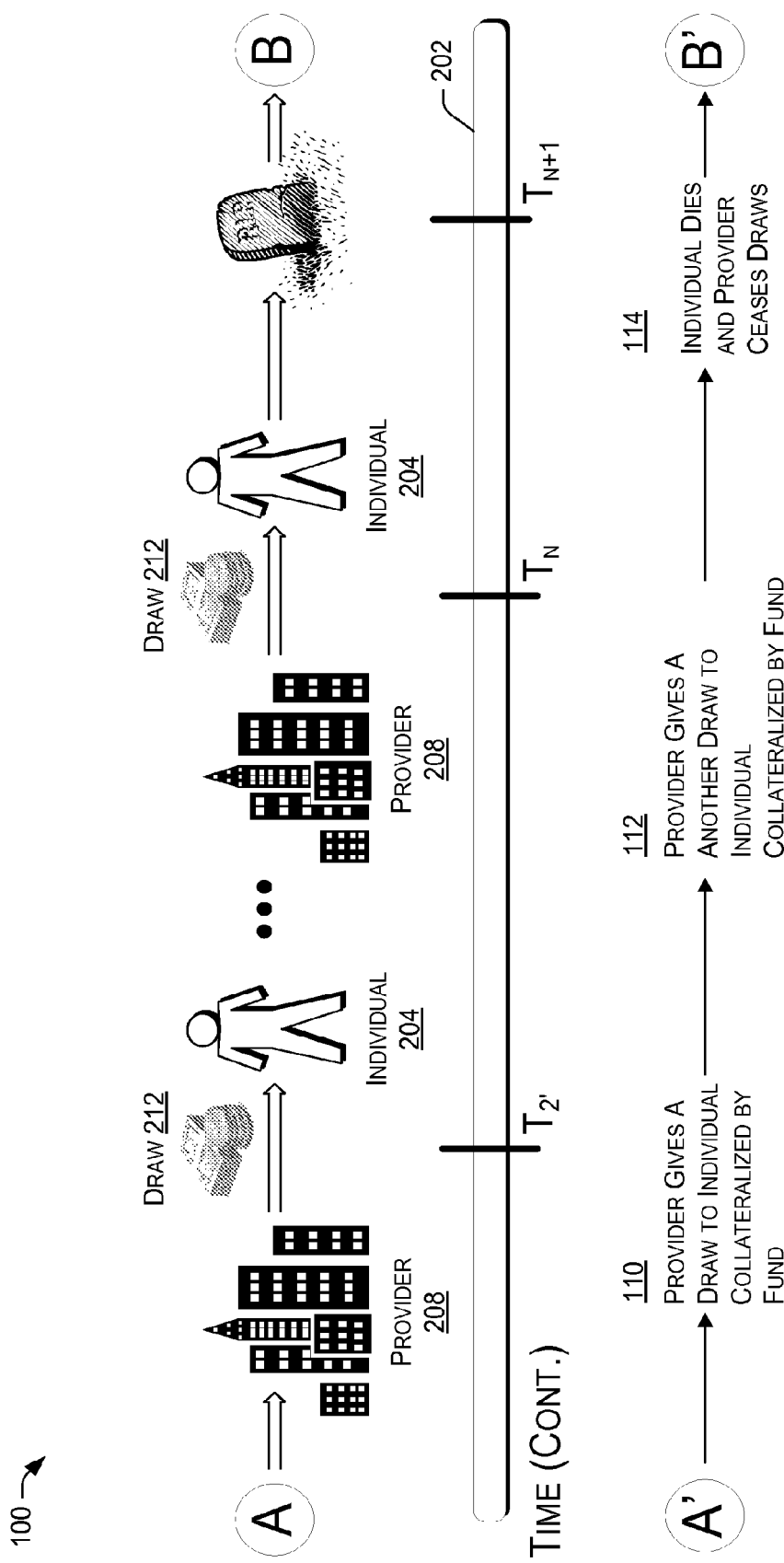
Figure 3:
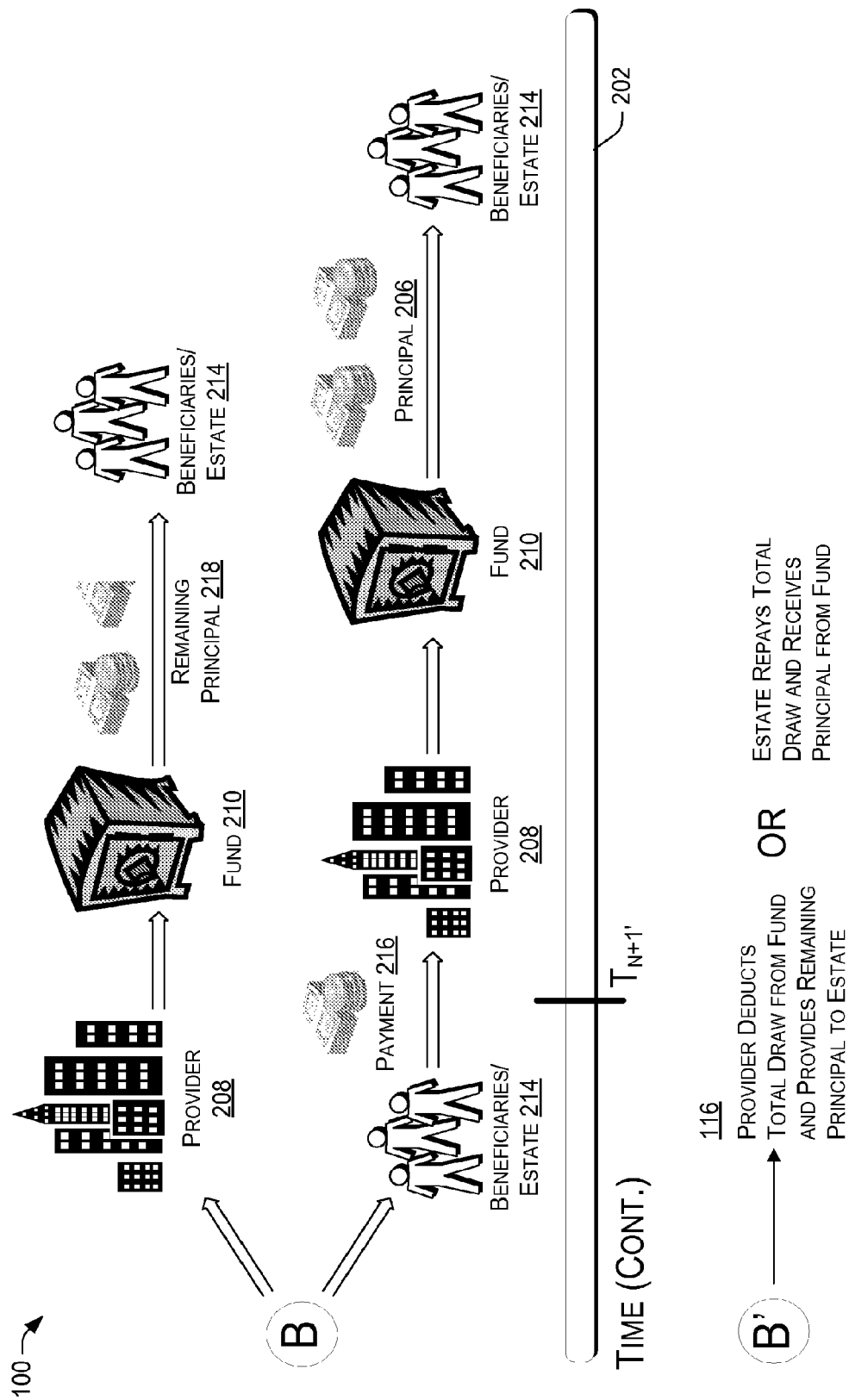

FIGS. 1-3 illustrate an exemplary process 100 to employ a collateralized loan with periodic draws subject to a triggering event. Process 100 is described with reference to a timeline 202 that chronologically tracks events associated with the process. It is noted that in some instances, process 100 may be implemented, in whole or in part, as a part of a system with mechanisms to implement operations of the process. For instance, process 100 may be stored on one or more computer-readable storage media executable on one or more processors of a computing device.

Process 100 includes an operation 102, which represents that an individual 204 gives a principal 206 to a provider 208. While FIG. 1 illustrates an individual, other embodiments may instead include partnerships, corporations or any other entity. Provider 208, meanwhile, may be a bank, credit union, stock brokerage firm, asset management firm, any other financial institution, or the like. At operation 104, provider 208 invests principal 206 into a fund 210. Fund 210 may be a mutual fund, stock, bond, bank account, or the like, or may be some combination thereof. Fund 210 may be self-directed, directed by provider 208, directed by fund 210 itself, or portions may be directed by different combinations thereof.

At a time ($T_1$) that individual 204 provides principal 206 to provider 208, individual 204 and provider 208 establish a line of credit that will enable individual 204 to receive periodic disbursements (i.e., draws on a loan) from provider 208. When establishing this line of credit, individual 204 and provider 208 agree that principal 206 within fund 210 serves as some or all of the collateral for the established line of credit.

While FIG. 1 illustrates that individual 204 provides principal 206 to provider 208 for the purposes of establishing a line of credit, individual 204 may instead use financial assets within an existing fund or financial account as collateral to establish the credit line. For instance, individual 204 may use financial assets within an existing mutual fund as collateral. In still other instances, certain mutual funds or other accounts may offer this collateralized loan to some or all members of the fund or account. Here, some individuals may opt to so establish this credit line with their mutual fund or account as collateral, while other individuals may not so choose.

Additionally, individual 204 and provider 208 agree upon a predetermined date or event upon which individual 204 may choose to draw from the line of credit. In some implementations, these parties agree that individual 204 may begin taking draws when individual 204 attains a certain age (e.g., 65).

When establishing this line of credit, individual 204 and provider 208 may also agree on a schedule of times at which individual 204 is entitled to draw from the established line of credit. In some instance, this schedule allows individual 204 to periodically draw upon the line of credit. For instance, these parties may agree that individual 204 is entitled to draw from the loan on a monthly, bi-annual, annual, or any other periodic basis. These parties will typically also agree on a variable or fixed interest rate at which these draws will be repaid. For instance, provider 208 may institute a fixed interest rate of, for example, 5-10% for the individual's outstanding loan amount. This interest rate is typically capitalized on the outstanding loan amount. This interest may be capitalized daily, weekly, monthly, annually, or on any other periodic basis.

Furthermore, individual 204 and provider 208 may also agree on a draw amount that individual 204 may periodically draw from provider 208. This draw amount may vary amongst succeeding draws or may remain fixed for the life of the draws. Additionally, individual 204 may choose to take a draw during some periods but not others. When individual 204 chooses not to take a draw for a scheduled period, the amount of this draw may be carried forward to future draws by the individual in some implementations. For instance, imagine that individual 204 takes a draw in year one, but does not take a draw in year two. In year three, provider 208 may allow individual 204 to draw twice the usual draw amount.

In some instances, the draw amount is based on the amount of principal 206. More specifically, this amount may be based on the amount of principal 206 at the predetermined time when individual may begin drawing from the line of credit. For instance, some or all of these draws may comprise a fixed or variable percentage of principal 206 at the predetermined time, such as when individual 204 attains the age of 65.

In instances where the amount of the draws equals a percentage of the amount of principal 206, these parties may similarly agree upon a percentage at time $T_1$. This percentage may also be agreed upon at or near time $T_1$. In some implementations, this agreed-upon percentage is based upon the individual's age at the time ($T_1$) that the individual gives principal 206 to provider 208. For instance, the following exemplary chart may be examined to determine a percentage of the individual's draws:

| Age at Inception (years) | Annual Withdrawal Rate (%) |
| --- | --- |
| 50 | 3.50-4.50 |
| 55 | 3.80-4.80 |
| 60 | 3.95-4.95 |
| 65 | 3.85-4.85 |
| 70 | 4.05-5.05 |
| 75 | 4.20-5.20 |

For instance, if individual 204 is fifty years of age at time $T_1$, then the above chart dictates that the individual may draw, for example, 4% of the amount of principal 206 at the predetermined first-draw date. In some instances, this percentage may vary (e.g., increase or decrease) with different draws. That is, a first draw may equal 4% of the amount of principal 206, while a second draw may be some differing percentage of this amount. In other instances, the percentage remains fixed for the life of the draws. That is, each of the individual's periodic draws will be 4% of the amount of principal 206. In instances where this percentage is calculated off of the amount of principal 206 at the first-draw-availability date, the actual amount of these draws similarly remains fixed.

Additionally, at time $T_1$ individual 204 and provider 208 may agree on a triggering event, the occurrence of which ceases the individual's line of credit. That is, these parties agree on some date or event wherein the individual is no longer entitled to receive draws from provider 208. In addition, occurrence of this triggering event may also result in some or the individual's entire outstanding loan amount becoming due. Individual 204 (or the individual's estate) may thus be required to repay the summation of any draws the individual has taken, as well as any interest accrued thereon. In some implementations, the repayment amount is limited to the value of the financial assets securing the line of credit. Stated another way, the client's estate is not obligated to repay any amount of the credit line which exceeds the value of the fund at the occurrence of the triggering event.

Lastly, the triggering event may prompt the return of principal 206. This return of principal may not only be contingent upon the triggering event, but in some instances is also contingent on payment of the individual's outstanding loan. In some instances, this outstanding loan may be repaid with some or all of principal 206. Here, the remaining principal, if any, is returned to the individual (or the individual's estate). In other instances, the individual's outstanding loan amount is paid with funds separate from principal 206. Here, the entirety of principal 206 (less any fees) may be returned upon the triggering event and upon satisfaction of the outstanding loan.

In the illustrated implementation, the agreed-upon triggering event is the death of individual 204. Therefore, in the illustrated implementation, individual 204 may take draws on the established line of credit starting at the predetermined date and continuing until individual 204 dies. At this point, the individual's estate or beneficiaries may be required to pay off the individual's outstanding loan amount in addition to any interest accrued thereon.

Additionally, at the individual's death and after satisfaction of the loan, the individual's estate or beneficiaries may receive some or all of principal 206, if any remains. Note that in some instances the individual's outstanding loan may actually exceed the amount of principal 206. Here, the individual's estate thus will not receive any of principal 206, if the estate or beneficiaries choose to pay the loan with the principal. Instead, the estate or beneficiaries may choose to apply principal 206 to the outstanding loan. In instances where the loan is a non-recourse loan, provider 208 may only seek reimbursement from the estate in an amount equal to principal 206. In instances where the loan is a recourse loan, however, provider 208 may seek payment, from the estate, in an equal to the difference between principal 206 and the outstanding loan amount plus any fees and/or interest charged thereon.

While the triggering event here is the individual's death, other triggering events may be employed in other embodiments. These may include the death of another reference person (e.g., the original purchaser if the loan has been assumed), attainment of a certain age by individual 204, dissolution of provider 208, or any other agreed-upon event. In fact, the triggering event may comprise multiple events, such as individual 204 dying at a time when the individual is at least 80 years of age. The triggering event may also comprise death of individual 204 as well as death of the individual's spouse. Finally, the triggering event may comprise the later (or earlier) of two or more events. For instance, the triggering event may be the later of the death of individual 204 or the 80$^{th}$ birthday of individual 204.

Returning attention to FIG. 1, illustrated operations 102 and 104 have been described. In the illustrated implementation of FIG. 1, individual 204 and provider 208 have established a line of credit for the individual and have agreed on multiple terms. For instance, assume that these parties have agreed that individual 204 is entitled to yearly draws beginning when individual 204 turns 65 years of age. Assume also that the amount of these draws is fixed and is based on the amount of principal 206 when individual 204 reaches 65. This amount is also based upon an age of individual 204 at time $T_1$ (that is, when individual 204 and provider 208 first invested principal 206). Assume that the individual is 50 years of age at time $T_1$ and, according to the chart reproduced above, is thus able to annually draw 4% of the amount of principal 206 measured at the individual's 65$^{th}$ birthday. Finally, assume that the individual and the provider have agreed on an interest rate of between 5% and 10% that will accrue on any outstanding loan amount.

With this in mind, process 100 proceeds to operation 106, which represents that principal 206 typically either grows or shrinks within fund 210 with time. In the current example, principal 206 grows in fund 210 for approximately 15 years (as the individual ages from 50 to 65) until the occurrence of operation 108. Principal 206 may also continue to grow until the principal is released to the individual or the individual's estate. During some or all of these years, provider 208 may charge an asset management fee (e.g., 50 basis points (bps)) to manage the financial assets. Note that this fee may be charged by the manager of fund 210, and is likely a fee that individual 204 would encounter in any traditional fund or other financial product. In some instances, provider 208 may also charge a loan commitment fee (e.g., 50 bps), which may address scenarios where the lifespan of individual 204 falls outside normalized values. One or both of these fees may be a one-time fee or a periodic fee.

Operation 108, meanwhile, represents that individual 204 attains a certain age, here 65. Because individual 204 and provider 208 agreed upon this time ($T_2$) as the triggering event, individual 204 is now eligible to draw on the established line of credit. Additionally, the amount of principal 206 at this time (coupled with the initially-determined percentage of 4%) dictates a ceiling on the amount of each draw that individual 204 may choose to take.

FIG. 2 continues the illustration of process 100. FIG. 2 begins by illustrating an operation 110, wherein individual 204 chooses to take a draw 212 on the line of credit that has been collateralized with principal 206. FIG. 2 illustrates that the individual takes draw 212 at a time $T_{2'}$. This time may correspond to the individual's 65$^{th}$ birthday (time $T_2$), or it may correspond to some time thereafter. Whatever the time, draw 212 here equals 4% of the value of principal 206 at the individual's 65$^{th}$ birthday.

As agreed upon, individual 204 may continue to annually take draw 212 until the individual's death. Operation 112 thus represents that individual 204 takes another draw at a time $T_n$. This draw may be the individual's second draw, or it may be, for example, the individual's thirtieth draw. Regardless of the number of draws taken between times $T_{2'}$ and $T_n$, operation 114 represents occurrence of the agreed upon triggering event, namely the death of individual 204. At this point, a right to draw upon the established credit understandably ceases. Additionally, the death of individual 204 triggers the provider's right to repayment of any outstanding loan amount (equal to the summation of all draws 212 plus any interest accrued thereon).

FIG. 3 also continues illustration of process 100 along timeline 202. This figure includes operation 116, which represents satisfaction of the outstanding loan in two different ways. First (and as illustrated along the top of FIG. 3), the individual's estate or beneficiaries 214 may choose to have provider 208 satisfy the outstanding loan obligation from principal 206 within fund 210. After this satisfaction, provider 208 then provides remaining principal 218, if any, to the estate or the individual's beneficiaries 214.

In some instances, however, the outstanding loan amount may actually be greater than the amount of principal 206 at the time of the individual's death. This may occur in instances where individual 204 lived long after the individual's attainment of age 65 and took multiple draws during this time frame. In these instances, provider 208 may use the entirety of principal 206 to satisfy the individual's outstanding loan amount. Here, provider 208 may or may not seek payment from the individual's estate for any surplus loan amount. In some instances, the initially agreed-upon loan is a non-recourse loan, and provider 208 thus does not have recourse to the estate beyond the initially-agreed upon collateral (here, principal 206).

In other instances, meanwhile, operation 116 represents that the individual's estate or beneficiaries 214 repay, in the form of a payment 216, the outstanding loan amount from funds other than principal 206. Here, provider 208 receives payment and releases some or all of principal 206 to the individual's estate or beneficiaries 214. Note that the amount of principal 206 may have grown or shrunk between the first-draw-availability date and the triggering event. Similarly, provider 208 may have deducted one or more fees from the principal. The amount of principal 206 returned to estate or beneficiaries 214 may accordingly vary based on these occurrences.

Finally, note that while process 100 illustrates an exemplary lifecycle of the described collateralized loan, this loan may also end before the triggering event (e.g., the individual's death) occurs. For instance, between a time (e.g. $T_1$) that individual 204 gives principal 206 to provider 208 and the predetermined time (e.g. $T_2$) at which individual 204 may begin taking draws 212, individual 204 may opt out of the loan agreement in some implementations. Similarly, individual 204 may opt out between the predetermined time (e.g. $T_2$) and the triggering event (e.g. $T_{n+1}$). Here, provider 208 may require that individual 204 repay any outstanding loan amount before releasing principal 206 to individual 204.

Individual 204 may also choose to withdraw a portion of principal 206 before the predetermined time, such as when the individual turns 65 years of age. The individual's loan commitment may accordingly be reduced. Similarly, individual 204 may choose to withdraw a portion of principal 206 after the predetermined time, such as the individual turning 65 years of age, and before the triggering event, such as the individual's death. Again, the individual's loan commitment may accordingly be reduced. In this latter scenario, however, provider 208 may require that individual 204 pay back some portion of the outstanding loan amount, plus some portion of any accrued interest and fees).

Exemplary Loan Agreement

Figure 4:
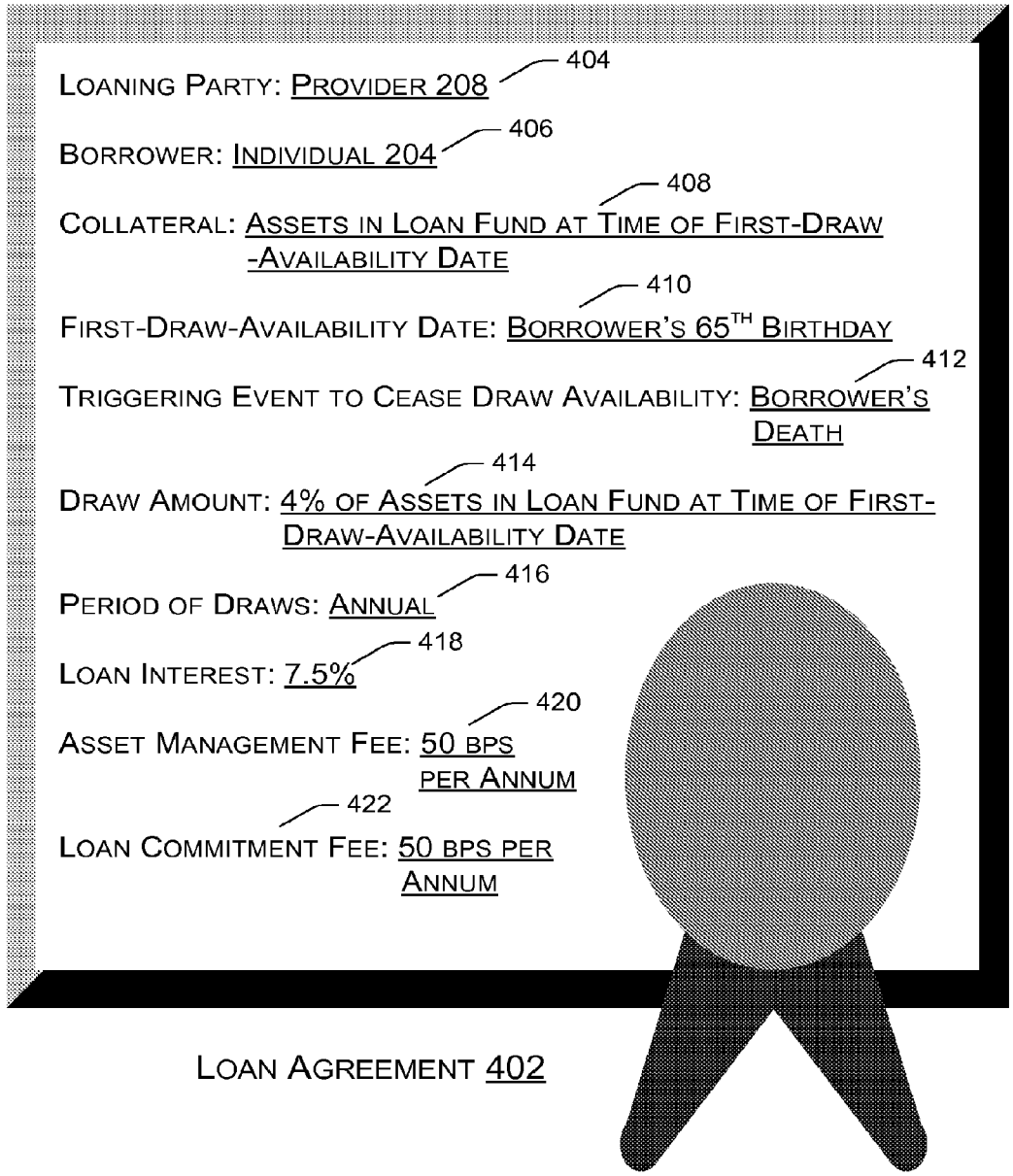
FIG. 4 illustrates an exemplary loan agreement that may be employed within the exemplary process of FIGS. 1-3.

FIG. 4 illustrates exemplary elements of a loan agreement 402 that individual 204 and provider 208 may enter into during exemplary process 100. In some instances, the information depicted within loan agreement 402 may be implemented as a data structure encoded on one or more computer-readable media.

Loan agreement 402 may include many or all of the elements present in a traditional loan agreement. In addition, loan agreement 402 may include elements unique to an agreement agreed-upon during exemplary process 100 described above. In fact, the illustrated agreement includes many of the same values as discussed above in FIG. 1. Of course, these values are merely exemplary and may vary in differing implementations. As illustrated, this agreement first states a loaning party 404, here provider 208. Similarly, the loan agreement lists individual 204 as a borrower 406.

Loan agreement 402 also lists a collateral 408, which here comprises financial assets in a loan fund (e.g., fund 210) at a time of a first-draw-availability date 410 (e.g., $T_2$). Financial assets as used herein means stocks, bonds, mutual funds, cash, and the like. Next, loan agreement 402 includes first-draw-availability date 410 referenced above. This date is the predetermined time at which individual 204 may choose to draw against collateral 408. Date 410 may occur at a known date (e.g. the individual's $65^{th}$ birthday) or upon occurrence of a predetermined future event, whose actual date is unknown when agreement 402 is reached. For instance, date 410 may occur if and when principal 206 reaches a predetermined amount.

Illustrated agreement 402 further includes a triggering event 412, upon which individual 204 may no longer take draws from the established line of credit. Again, the exemplary triggering event here comprises death of the borrower. Loan agreement 402 also illustrates a draw amount 414 of each draw. As discussed above, this amount may be fixed or variable amongst different periodic draws. Here, draw amount 414 is "4% of [the] assets in [the] loan fund at [the] time of [the] first-draw availability date". In addition to the amount, loan agreement 402 illustrates a period 416 at which individual 204 may take draws 212. Here, individual 204 may take draws annually.

Finally, loan agreement 402 depicts a loan interest amount 418, an asset management fee 420, and a loan commitment fee 422. As described with reference to FIGS. 1-3, these amounts are here illustrated as 7.5%, 50 bps per annum, and 50 bps per annum, respectively. This interest may be capitalized, while the latter two fees may be one-time or periodic fees.

Operation

Figure 5:
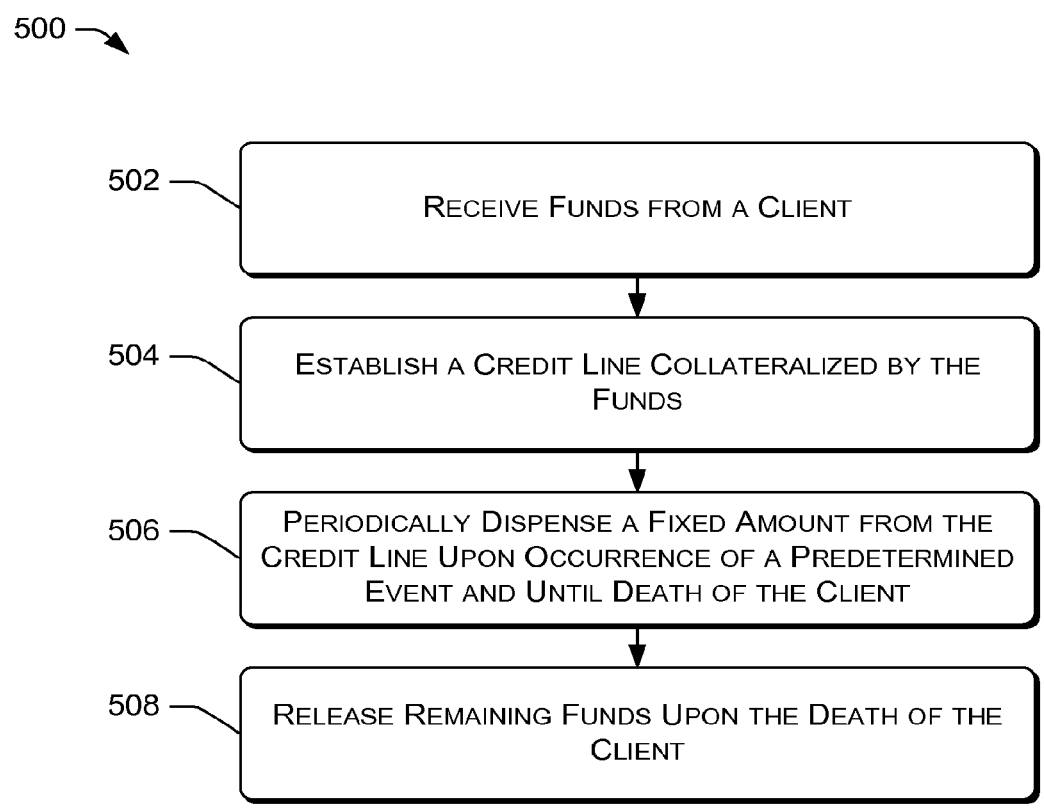
FIG. 5 illustrates an exemplary flow diagram for establishing a collateralized line of credit, dispensing an amount from the credit line, and releasing funds that collateralize the loan.

FIG. 5 illustrates an exemplary flow diagram of a process 500 for implementing the loan structure described above. Process 500 is illustrated as a collection of blocks in a logical flow graph, which represent a sequence of operations that can be implemented in hardware, software, or a combination thereof. All processes described throughout this document may similarly comprise a sequence of operations that can be implemented in hardware, software, or a combination thereof. In the context of software, the blocks represent computer-executable instructions that, when executed by one or more processors, perform the recited operations. This process may thus be automated in some instances and may operate within or under the control of provider 208 or within a computing device of the provider. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 500 includes operation 502, which represents receiving funds from a client such as individual 204. In the scenario described above provider 208 receives these funds in some instances and invests the funds in a loan fund such as fund 210. These funds are received as a single lump sum in some instances, and periodically in other instances. Next, operation 504 represents establishing a credit line collateralized by the funds. This establishing may be based at least in part upon a value of the funds after management and loan commitment fees are subtracted from the funds. These management and loan commitment fees may comprise a one time event or a periodic event.

Operation 506, meanwhile, periodically dispenses a fixed amount from the credit line upon occurrence of a predetermined event (e.g., the client reaching a certain age) and until death of the client. In some implementations, this fixed amount may be based, at least in part, upon a first factor established at the time of the receiving and second factor established at the time of the dispensing. In some instances, these factors comprise an age of the client at the time of the receiving and the value of the funds at the time of the dispensing, respectively. This fixed amount may also be determined, at least in part, as a percent of a value of the fund at the time of the predetermined event. This percent may be determined at or before the receiving of the funds. Additionally, note that while process 500 describes the dispensed amounts as fixed, in other instances these amounts may not be fixed.

Finally, operation 508 represents releasing any remaining funds upon the death of the client. In some instances, this operation comprises releasing a value of the funds at the time of death minus any dispensed fixed amounts and associated capitalized interest. In other instances, this operation comprises collecting any dispensed fixed amounts and associated capitalized interest and releasing the funds (e.g., most or all of the principal 206). Note that these funds may be released to the client's estate. Lastly, while process 500 describes one exemplary life cycle of the described loan, the client may also choose to receive back funds (potentially less any management and loan commitment fees) prior to the predetermined event.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more non-transitory computer-readable storage media comprising computer-executable instructions that, when executed perform acts comprising:
    receiving an indication from a client to manage a financial asset as collateral for a line of credit;
    deducting loan commitment fees from the financial asset;
    periodically dispensing a fixed amount from the credit line upon occurrence of a predetermined event and until death of the client; and,
    releasing any remaining funds upon the death of the client.

2. The one or more non-transitory computer-readable storage media of claim 1, wherein the receiving comprises one or more of: receiving an indication from the client to move the financial asset to a loan fund, and receiving an indication from the client to manage the financial asset in an existing fund in a manner sufficient to allow said deducting and said dispensing.

3. The one or more non-transitory computer-readable storage media of claim 1, further comprising computer-executable instructions that, when executed determine an outstanding loan amount.

4. The one or more non-transitory computer-readable storage media of claim 3, further comprising computer-executable instructions that, when executed determine an interest rate to be applied to the outstanding loan amount.

5. The one or more non-transitory computer-readable storage media of claim 1, further comprising computer-executable instructions that, when executed determine whether the fixed amount periodically dispensed from the credit line should be suspended.

6. The one or more non-transitory computer-readable storage media of claim 1, further comprising computer-executable instructions that, when executed, determines the fixed amount periodically dispensed from the credit line based on the age of the client.

7. A system comprising:
a processor;
a non-transitory computer-readable medium comprising computer-executable instructions that, when executed by the processor perform acts comprising:
establishing a loan fund service for receiving client assets, wherein the loan fund service is configured to deduct loan commitment fees from the client assets and to establish a line of credit collateralized by the client assets, and wherein the loan fund service is configured to periodically dispense a draw amount from the credit line upon occurrence of a predetermined event and until death of the client and to release any remaining client assets upon the death of the client.

8. The system of claim 7, further comprising a means for receiving a selection from an estate or beneficiary of the client to pay all or a portion of an outstanding loan amount from funds other than the client assets used to collateralize the line of credit.

9. The system of claim 7, further comprising a means for establishing the line of credit.

10. The system of claim 7, wherein the client assets are received as a lump sum or in periodic installments.

11. The system of claim 7, further comprising a means for determining an amount of the loan commitment fees.

12. The system of claim 7, wherein the predetermined event includes the client reaching a certain age.

13. The system of claim 7, wherein the draw amount periodically dispensed is based, at least in part, upon a first factor established at the time of receiving the client assets and a second factor established at the time of dispensing.

14. The system of claim 13, wherein the first factor includes one or more of an age of the client, a value of the client assets, or a percent of a value of the client assets.

15. The system of claim 7, wherein the draw amount is a fixed amount.

16. One or more non-transitory computer-readable storage media comprising computer-executable instructions that, when executed perform acts comprising:
tracking financial assets of a plurality of clients in an investment fund; and,
allowing an individual client to specify whether the financial assets of the individual client are to be managed in a manner that dispenses draws to the individual client upon occurrence of a predetermined event and until death of the individual client at which time any remaining assets are released, and wherein the draws are taken against a credit line collateralized by the individual client's assets.

17. The one or more non-transitory computer-readable storage media of claim 16, further comprising computer-executable instructions that, when executed determine an outstanding loan amount for the individual client.

18. The one or more non-transitory computer-readable storage media of claim 17, further comprising computer-executable instructions that, when executed determine an interest rate to be applied to the outstanding loan amount.

19. The one or more non-transitory computer-readable storage media of claim 16, further comprising computer-executable instructions that, when executed determine whether future draws dispensed against the credit line should be suspended.

20. The one or more non-transitory computer-readable storage media of claim 16, further comprising computer-executable instructions that, when executed, determines a draw amount to be dispensed.

* * * * *